US008116776B1

(12) United States Patent
Jagadeesan et al.

(10) Patent No.: US 8,116,776 B1
(45) Date of Patent: Feb. 14, 2012

(54) MOBILE COMMUNICATION HANDOFF BETWEEN HETEROGENEOUS NETWORKS

(75) Inventors: Ramanathan T. Jagadeesan, San Jose, CA (US); Bich T. Nguyen, Los Altos, CA (US); Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 10/808,032

(22) Filed: Mar. 23, 2004

(51) Int. Cl.
*H04W 36/00* (2009.01)
*H04W 4/00* (2009.01)

(52) U.S. Cl. ..... 455/438; 455/433; 455/434; 455/432.1; 455/432.2; 455/432.3; 455/435.2; 455/552.1; 455/435.1; 370/331; 370/332; 370/352; 370/356

(58) Field of Classification Search .......... 455/433–439, 455/432, 435.2, 432.7, 552.1, 435.1, 432.1–432.3; 370/331, 332, 338, 352–356
See application file for complete search history.

(56) References Cited

U.S. PATENT DOCUMENTS

| 5,602,843 | A | 2/1997 | Gray | 370/338 |
|---|---|---|---|---|
| 5,771,275 | A | 6/1998 | Brunner et al. | 379/67 |
| 5,796,729 | A | 8/1998 | Greaney et al. | 370/345 |
| 5,818,824 | A | 10/1998 | Lu et al. | 370/328 |
| 5,970,059 | A | 10/1999 | Ahopelto et al. | 370/338 |
| 6,014,377 | A | 1/2000 | Gillespie | 370/351 |
| 6,073,029 | A | 6/2000 | Smith et al. | 455/555 |
| 6,167,040 | A | 12/2000 | Haeggstrom | 370/352 |
| 6,223,055 | B1 | 4/2001 | Cyr | 455/555 |
| 6,243,581 | B1 | 6/2001 | Jawanda | 455/432 |
| 6,314,284 | B1 | 11/2001 | Patel et al. | 455/417 |
| 6,317,609 | B1 | 11/2001 | Alperovich et al. | 455/556 |
| 6,411,632 | B2 | 6/2002 | Lindgren et al. | 370/466 |
| 6,424,638 | B1 | 7/2002 | Ray et al. | 370/331 |
| 6,539,237 | B1 | 3/2003 | Sayers et al. | 455/555 |
| 6,665,537 | B1 * | 12/2003 | Lioy | 455/435.1 |
| 6,687,243 | B1 | 2/2004 | Sayers et al. | 370/356 |
| 6,788,681 | B1 * | 9/2004 | Hurren et al. | 370/389 |
| 6,804,532 | B1 * | 10/2004 | Moon et al. | 455/552.1 |
| 2004/0246990 | A1 * | 12/2004 | Krishnamurthi et al. | 370/466 |
| 2005/0083909 | A1 * | 4/2005 | Kuusinen et al. | 370/352 |

FOREIGN PATENT DOCUMENTS

EP 0 766 427 A2 4/1997

* cited by examiner

*Primary Examiner* — Charles Appiah
*Assistant Examiner* — Emem Stephen
(74) *Attorney, Agent, or Firm* — Baker Botts L.L.P.

(57) ABSTRACT

A method for providing telecommunication service includes transmitting a node identifier to a mobile station over a first network that supports a first communication protocol and receiving a handoff call, based on the node identifier, from the mobile station over a second network that supports a second communication protocol. The handoff call includes a mobile station identifier. The method further includes identifying a first communication link over the first network based on the mobile station identifier and initiating a second communication link with the mobile station over the second network. The method also includes terminating the first communication link.

37 Claims, 3 Drawing Sheets

MOBILE COMMUNICATION HANDOFF BETWEEN HETEROGENEOUS NETWORKS

TECHNICAL FIELD OF THE INVENTION

This invention relates in general to telecommunications, and more particularly to mobile communication systems.

BACKGROUND OF THE INVENTION

Telephony infrastructure has seen significant growth and development in recent years. Users of mobile communication devices can now obtain service essentially anywhere in the world. However, the incremental nature of these improvements has produced a patchwork collection of networks supporting a variety of different communication technologies.

SUMMARY OF THE INVENTION

In accordance with the present invention, the disadvantages and problems associated with providing telecommunication services have been substantially reduced or eliminated. In particular, a method and system are provided for performing handoffs between heterogeneous networks.

In accordance with one embodiment of the present invention, a method for providing telecommunication service includes transmitting a node identifier to a mobile station over a first network that supports a first communication protocol and receiving a handoff call, based on the node identifier, from the mobile station over a second network that supports a second communication protocol. The handoff call includes a mobile station identifier. The method further includes identifying a first communication link over the first network based on the mobile station identifier and initiating a second communication link with the mobile station over the second network. The method also includes terminating the first communication link.

In accordance with another embodiment of the present invention, a system for providing telecommunication service includes a mobile station, a first network, a second network, and a handoff server. The first network is operable to support communication according to a first communication protocol. The second network is operable to support communication according to a second communication protocol. The handoff server is operable to transmit a node identifier to the mobile station over the first network and to receive, based on the node identifier, a handoff call from the mobile station over the second network. The handoff call includes a mobile station identifier. The handoff server is further operable to identify a first communication link over the first network, based on the mobile station identifier, and to initiate a second communication link with the mobile station on the second network. Additionally, the handoff server is operable to extract routing information from media received over the first communication link and to transmit media received from the mobile station on the second communication link to the remote element based on the routing information.

Technical advantages of certain embodiments of the present invention include providing a handoff between heterogeneous communication networks. Other technical advantages of certain embodiments of the present invention include the ability to execute handoffs that are transparent to users and telecommunication components, greater flexibility in providing service to mobile device users, and simplified integration with existing components.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
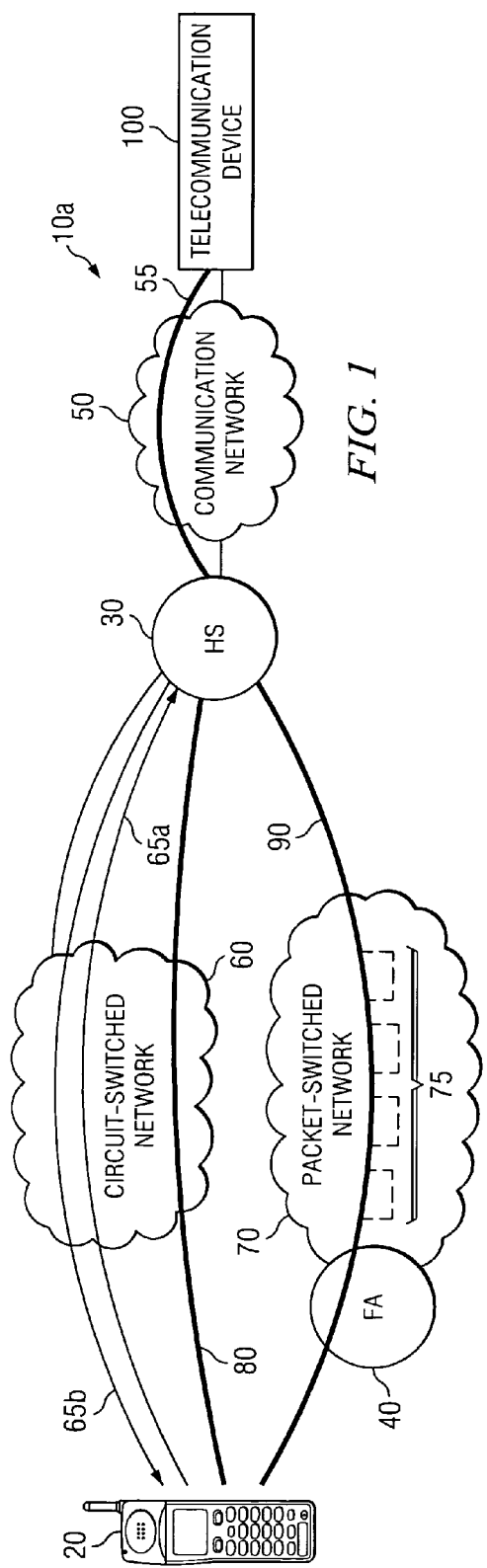
FIG. 1 illustrates operation of a communication system according to a particular embodiment.

FIG. 1 illustrates a communication system 10a that supports communication between a mobile station 20 and a telecommunication device 100, according to a particular embodiment of the present invention. Communication system 10a includes mobile station 20, a handoff server 30, a foreign agent 40, a circuit-switched network 60, a packet-based network 70, and telecommunication device 100. Communication system 10a supports a communication session 55 between mobile station 20 and telecommunication device 100 that utilizes either circuit-switched network 60 or packet-switched network 70. Communication system 10a is capable of executing a handoff between the heterogeneous networks of communication system 10a in response to a handoff call initiated by mobile station 20.

Mobile station 20 provides wireless communication services to a user of mobile station 20. Mobile station 20 may provide the user voice, video, and/or data communication. Mobile station 20 is capable of transmitting and receiving packets 75 from packet-based network 70. Mobile station 20 is also capable of transmitting media stream 65a and receiving media stream 65b from circuit-switched network 60. Examples of mobile station 20 include mobile phones, personal digital assistants ("PDAs"), laptop computers, and any other portable devices capable of using both packet-based and circuit-switched communication technologies.

Handoff server 30 transmits media received from mobile station 20 on circuit-switched network 60 or packet-based network 70 to telecommunication device 100 as part of communication session 55. Handoff server 30 is also capable of transferring communication with mobile station 20 from packet-based network 70 to circuit-switched network 60, or from packet-based network 70 to circuit-switched network 60, in response to handoff requests received from mobile station 20. Handoff server 30 may represent a server, router, bridge, switch, gateway, networked personal computer (PC), and/or any other component, including any appropriate combination of hardware and/or software, suitable for providing the described functionality.

In particular embodiments of communication system 10a, handoff server 30 may also serve as a mobile Internet Protocol (IP) home agent for mobile station 20 capable of supporting both IP-tunneling and reverse IP-tunneling for mobile station 20, as shown in FIG. 1. Alternatively, handoff server 30 may register a care-of address for mobile station 20 with another component functioning as a home agent. Handoff server 30 may then receive packets for mobile station 20 forwarded from the home agent, as described in greater detail with respect to FIG. 2.

Foreign agent 40 provides mobile station 20 with access to packet-based network 70. More specifically, foreign agent 40 forwards packets 75 received from handoff server 30 to mobile station 20 and forwards packets from mobile station 20 to handoff server 30. Foreign agent 40 may represent one of several foreign agents 40 in communication system 10*a*, each responsible for providing service to mobile units 20 operating in a particular geographic location. Foreign agent 40 may represent a server, router, bridge, switch, gateway, and/or any other component, including any appropriate combination of hardware and/or software, suitable for providing the described functionality. Additionally, foreign agent 40 may incorporate any appropriate hardware and/or software for conducting wireless communication with mobile station 20, such as for operation as a wireless LAN (WLAN) access point.

Circuit-switched network 60 supports communication between mobile station 20 and handoff server 30 over a circuit-switched link 80. Circuit-switched network 60 represents any collection of hardware and/or software configured to communicate information along a dedicated communication link between two or more endpoints, such as mobile station 20 and handoff server 30. Circuit-switched network 60 may include switches, trunks, central offices (COs), gateways, and/or any other suitable components in any suitable form or arrangement. Furthermore, circuit-switched network 60 may comprise any combination of public or private communication equipment and/or any combination of separate networks. In a particular embodiment, circuit-switched network 60 represents a portion of a public switched telephone network (PSTN). Additionally, circuit-switched network 60 may incorporate any appropriate hardware and/or software for conducting wireless communication with mobile station 20, such as cellular base stations, antennas, and/or cell sites.

Although FIG. 1 and the description below assume that circuit-switched network 60 transmits information to handoff server 30 as media stream 65*a*, circuit-switched network 60 may additionally include a voice gateway responsible for packetizing and encapsulating media stream 65*a* for transmission to handoff server 30. For example, the voice gateway may encapsulate media stream 65*a* by adding Real-time Transfer Protocol (RTP), User Datagram Protocol (UDP), and Internet Protocol (IP) headers that identify handoff server 30 as the destination for media stream 65*a*, specify a sequence for media stream 65*a*, or provide any other information about media stream 65*a*. If circuit-switched network 60 does include a voice gateway that encapsulates media stream 65*a*, handoff server 30 may re-encapsulate media stream 65*a*, for example, by replacing the RTP, UDP, and IP headers included in encapsulated media stream 65*a* with new RTP, UDP, and IP headers identifying a new destination and/or ordering for media stream 65*a*. Thus, in the description of the operation of handoff server 30 below, any reference to "encapsulation" may actually represent, in particular embodiments, formatting, modification, or re-encapsulation performed by handoff server 30.

Packet-based network 70 supports communication between mobile station 20 and handoff server 30 using packet-based link 90. Packet-based network 70 may represent any hardware and/or software configured to communicate information in the form of packets, cells, frames, segments or other portions of data. Packet-based network 70 may include routers, hubs, switches, gateways, call controllers, and/or any other suitable components in any suitable form or arrangement. In general, packet-based network 70 may represent any combination of public or private communication equipment such as elements of PSTN, a global computer network such as the internet, a local area network (LAN), a wide-area network (WAN), or other appropriate communication equipment.

Communication network 50 represents any form of communication network supporting circuit-switched, packet-based, and/or any other suitable type of communication. Moreover, communication network may represent one or more separate networks, including all or parts of packet-based network 70 and/or circuit-switched network 60. Communication network 50 may include routers, hubs, switches, gateways, call controllers, and/or any other suitable component to any suitable form or arrangement. In general, communication network 50 may comprise any combination of public or private communication equipment such as elements of PSTN, a global computer network such as the internet, a local area network (LAN), a wide-area network (WAN), or other appropriate communication equipment.

In operation, mobile station 20 initiates a communication session 55 with telecommunication device 100. Communication session 55 may represent any form of communication between mobile station 20 and telecommunication device 100 suitable for transmitting information between the two components, such as a phone call. Communication session 55 includes a plurality of communication links which connect mobile station 20, handoff server 30, telecommunication device 100, and other appropriate nodes within packet-based network 70, circuit-switched network 60, or communication network 50 to couple mobile station 20 and telecommunication device 100. For example, communication session 55 may include circuit-switched link 80 or packet-based link 90 that connect mobile station 20 to handoff server 30 and additional communication links connecting handoff server 30 to telecommunication device 100.

Once initiated, circuit-switched link 80 and packet-based link 90 connect mobile station 20 and handoff server 30 over circuit-switched network 60 and packet-based network 70, respectively. In a particular embodiment, circuit-switched link 80 supports communication between mobile station 20 and handoff server 30 in the form of media streams 65, while packet-based link 90 supports communication in the form of packets 75. Circuit-switched link 80 and packet-based link 90 may each represent one of multiple communication links over which communication session 55 takes place, or may represent the sole link of a separate communication session between mobile station 20 and handoff server 30. For example, in a cellular telephone call between mobile station 20 and telecommunication device 100, circuit-switched link 80 may represent one of multiple communication links within communication session 55 that connects mobile station 20 to telecommunication device 100. Alternatively, as described in greater detail below, in a handoff call between mobile station 20 and handoff server 30, circuit-switched link 80 may represent the entirety of a communication link between mobile station 20 and handoff server 30 that supports a communication session 55 associated with the handoff call.

As part of communication session 55, mobile station 20 transmits media to handoff server 30 over circuit-switched network 60 or packet-based network 70. Handoff server 30 transmits media received from mobile station 20 to telecommunication device 100 over communication network 50. Handoff server 30 may also convert information received from mobile station 20, such as media stream 65*a* or packets 75, to a format appropriate for transmission according to a protocol supported by communication network 50 and/or telecommunication device 100. For example, if telecommunication device 100 represents a telephone that does not support VoIP, handoff server 30 may convert packets 75 received from mobile station 20 to a media stream before transmitting information in packets 75 to telecommunication device 100.

As mobile station 20 changes location, mobile station 20 may move between service areas of circuit-switched network 60 and packet-based network 70, requiring a handoff between the two networks. For example, assume mobile station 20 initiates communication with telecommunication device 100 on packet-based network 70 by establishing communication session 55 over packet-based link 90. In a particular embodiment, communication session 55 represents a Voice over IP (VoIP) phone call between mobile station 20 and telecommunication device 100. In this embodiment, packet-based link 90 represents a mobile-IP tunnel between mobile station 20 and handoff server 30. Although the remainder of this description assumes that communication session 55 and packet-based link 90 represent, respectively, a VoIP phone call and a mobile-IP tunnel formed as part of the VoIP phone call, communication session 55 and packet-based link 90 may represent any communication links appropriate for transmitting realtime communication using packet-based communication technologies.

In this VoIP example, mobile station 20 may initiate packet-based link 90 by first registering with handoff server 30, which, as noted above, functions as a home agent for mobile station 20 in the illustrated embodiment. Mobile station 20 may register with handoff server 30 through foreign agent 40 using conventional mobile IP techniques. More specifically, mobile station 20 may specify to foreign agent 40 a particular handoff server 30 associated with a home network of mobile station 20. Foreign agent 40 may then register with handoff server 30 by transmitting a registration request to handoff server 30. The registration request may include a care-of address for mobile station 20 and may additionally request a tunnel for packets 75 sent by mobile station 20. Mobile station 20 then places a call to telecommunication device 100 through handoff server 30, establishing communication session 55. In this example, mobile station 20 establishes communication session 55 using conventional VoIP signaling and mobile IP techniques.

During call setup or at any other appropriate time, mobile station 20 communicates a mobile identifier 25 to handoff server 30 and handoff server 30 communicates a node identifier 35 to mobile station 20. Mobile identifier 25 represents an identifier by which handoff server 30 can uniquely identify mobile station 20. Mobile identifier 25 may represent a mobile equipment identifier (MEID), mobile identification number (MIN), international mobile station identifier (IMSI), or any other unique identifier of mobile station 20. Node identifier 35 represents an identifier that includes information sufficient for mobile station 20 to contact handoff server 30 on circuit-switched network 60, such as a phone number associated with handoff server 30.

Mobile station 20 then communicates packets 75 to handoff server 30 over packet-based link 90, as part of communication session 55. More specifically, mobile station 20 transmits packets 75 to foreign agent 40, which forwards packets 75 to handoff server 30. Handoff server 30 then communicates information in packets 75 to telecommunication device 100 over communication network 50. In a particular embodiment, communication network 50 also supports packet-based communication, and handoff server 30 routes packets 75 to telecommunication device 100. Additionally, telecommunication device 100 transmits packets 75 to handoff server 30 over communication network 50. Handoff server 30 then routes packets 75 received from telecommunication device 100 to mobile station 20 over packet-based network 70. In this VoIP example, this may include handoff server 30 routing packets 75 to foreign agent 40 through packet-based network 70, using the care-of address handoff server 30 received during registration. Foreign agent 40 may then transmit packets 75 to mobile station 20.

During communication, mobile station 20 may detect a handoff trigger. The handoff trigger may represent any suitable event indicating to mobile station 20 that a handoff between packet-based network 70 and circuit-switched network 60 is appropriate. For example, handoff trigger may represent a determination by mobile station 20 that a signal strength associated with packet-based network 70 is below a predetermined threshold, a determination that a signal strength associated with circuit-switched network 60 is greater than the signal strength associated with packet-based network 70, receipt of an input from a user indicating a desire to switch networks, or any other appropriate event. In response to the handoff trigger, mobile station 20 makes a handoff call to handoff server 30 through circuit-switched network 60 using node identifier 35. For example, if node identifier 35 represents a phone number associated with handoff server 30, mobile station 20 places a handoff call to handoff server 30 on circuit-switched network 60 using this phone number. As part of the handoff call, mobile station 20 establishes circuit-switched link 80, which couples mobile station 20 and handoff server 30 over circuit-switched network 60. During the handoff call, mobile station 20 communicates mobile identifier 25 to handoff server 30 and, using mobile identifier 25, handoff server 30 associates the handoff call with packet-based link 90 that supports ongoing communication session 55.

Mobile station 20 then begins transmitting media of communication session 55 to handoff server 30 as media stream 65*a*, and handoff server 30 begins transmitting to mobile station 20 media from communication session 55 as media stream 65*b*. In particular embodiments, handoff server 30 may also begin reformatting information received from mobile station 20 for transmission to telecommunication device 100 over communication network 50. For example, handoff server 30 may encapsulate media stream 65*a* for delivery to telecommunication device 100 using information extracted from packet-based link 90. More specifically, if communication network 50 utilizes RTP to support communication between handoff server 30 and telecommunication device 100, handoff server 30 may packetize media stream 65 and attach RTP, UDP, and IP headers that are extracted from packet-based link 90. The headers may identify a destination for encapsulated media stream 65*a*, a sequence for packets of encapsulated media stream 65*a*, the source of encapsulated media stream 65*a*, and/or any other suitable information.

During this period, mobile station 20 continues to transmit both packets 75 and media stream 65*a* associated with the VoIP call to handoff server 30. Handoff server 30 may continue to route only packets 75 to telecommunication device 100, or may route any appropriate mix of packets 75 and encapsulated media stream 65*a* to telecommunication device 100. Handoff server 30 also continues to transmit packets 75 and media stream 65*b* to mobile station 20. Mobile station 20 may continue to play only packets 75, or may play any appropriate mix of packets 75 and encapsulated media stream 65*b* to the user.

Mobile station 20 and handoff server 30 may then synchronize packets 75 and media streams 65 received by each component. Handoff server 30 may perform media processing on media stream 65a and/or packets 75 received from telecommunication device 100, such as delay and level difference compensation and/or any other form of appropriate processing, to synchronize media stream 65a and packets 75 and ensure that the switchover between packets 75 and media stream 65a appears seamless to telecommunication device 100. This media processing may result in time-shifting, mixing, or other processing of media stream 65a and/or packets 75. Mobile station 20 may also perform media processing on media stream 65b and/or packets 75 to synchronize media stream 65b and packets 75 and to ensure that the switchover appears seamless to a user of mobile station 20.

Once handoff server 30 synchronizes packets 75 and media stream 65a and mobile station 20 synchronizes packets 75 and media stream 65b, handoff server 30 and mobile station 20 may determine that a switchover between packet-based link 90 and circuit-switched link 80 can proceed. Mobile station 20 and handoff server 30 may determine this based on signaling between the two components, based on a predetermined time limit allotted for synchronization, or based on any other appropriate consideration. At the appropriate time, handoff server 30 stops transmitting packets 75 to mobile station 20 and transmits only media stream 65b. Additionally, mobile station 20 stops transmitting packets 75 to handoff server 30 and transmits only media stream 65a, reformatted as appropriate.

After the switchover from packet-based link 90 to circuit-switched link 80 is complete, handoff server 30 facilitates communication between mobile station 20 and telecommunication device 100 as part of communication session 55, using circuit-switched link 80. Additionally, handoff server 30 and mobile station 20 may tear down packet-based link 90. Mobile station 20, handoff server 30, and/or foreign agent 40 may also take any other steps appropriate to complete the handoff.

As another example, mobile station 30 may instead detect a handoff trigger while communicating with telecommunication device 100 over circuit-switched network 60. More specifically, assume while operating within a geographic area associated with circuit-switched network 60, mobile station 20 initiates communication with telecommunication device 100. Using conventional signaling or other appropriate techniques, mobile station 20 establishes communication session 55 with telecommunication device 100 that utilizes circuit-switched link 80. For example, mobile station 20 may use a wireless wide area network (WWAN) connection for signaling telecommunication device 100 to setup communication and/or to establish circuit-switched link 80. Alternatively, mobile station 20 may utilize phone proxy capabilities of handoff server 30 to establish communication with telecommunication device 100. In a particular embodiment, communication session 55 represents a cellular voice call between mobile station 20 and telecommunication device 100 using circuit-switched link 80 between mobile station 20 and handoff server 30. Although the remainder of this description assumes that communication session 55 represents a cellular voice call, communication session 55 may represent any suitable communication session established using, at least in part, circuit-switched communication technologies. Mobile station 20 may also communicate mobile identifier 25 to handoff server 30 during call setup.

Once communication session 55 between mobile station 20 and telecommunication device 100 has been successfully established, mobile station 20 begins to transmit media stream 65a to handoff server 30 over circuit-switched network 60. In a particular embodiment, handoff server 30 may packetize, encapsulate, or otherwise reformat media stream 65a for transmission to telecommunication device 100. For example, handoff server 30 may use a network address of telecommunication device 100 to generate RTP, UDP, and IP headers for media stream 65 and perform RTP-encapsulation of media stream 65a for delivery to telecommunication device 100. Additionally, handoff server 30 may convert packets or any other media signals received from telecommunication device 100 into media stream 65b for transmission to mobile station 20 over circuit-switched network 60. Although the remainder of this example assumes handoff server 30 communicates media with telecommunication device 100 in the form of packets, telecommunication device 100 may communicate media with telecommunication device 100 in any appropriate manner based on the characteristics of communication network 50 and telecommunication device 100.

While communicating with telecommunication device 100 over circuit-switched link 80, mobile station 20 may enter a geographic area associated with packet-based network 70. Mobile station 20 may then register with handoff server 30 for mobile IP service through packet-based network 70 using foreign agent 40, as described above. After registering with handoff server 30, mobile station 20 may detect a handoff trigger. In this example, the handoff trigger may represent any event indicating to mobile station 20 that a handoff between circuit-switched network 60 and packet-based network 70 is appropriate. For example, handoff trigger may represent a determination by mobile station 20 that a signal strength associated with circuit-switched network 60 is below a predetermined threshold, a determination that a signal strength associated with packet-based network 70 is greater than the signal strength associated with circuit-switched network 60, receipt of an input from a user indicating a desire to switch networks, or any other appropriate event. In response to the handoff trigger, mobile station 20 makes a handoff call to handoff server 30 through packet-based network 60. In this situation, handoff call may represent any suitable form of communication from mobile station 20 to handoff server 30 indicating a desire to execute a handoff. In a particular embodiment, handoff call represents a VoIP call request sent to handoff server 30.

As part of the handoff call, handoff server 30 initiates packet-based link 90 with mobile station 20. Mobile station 20 may establish packet-based link 90 based on conventional VoIP techniques, or any other appropriate methods. Using packet-based link 90, mobile station 20 transmits packets 75 to handoff server 30 through foreign agent 40. Based on mobile identifier 25, handoff server 30 associates packets 75 received from foreign agent 40 as part of packet-based link 90 with ongoing communication session 55 that is using circuit-switched link 80. Additionally, handoff server 30 begins to route packets 75 received from telecommunication device 100 as part of the cellular call to foreign agent 40 for transmission to mobile station 20.

During this period, mobile station 20 continues to transmit both media stream 65a and packets 75 to handoff server 30. Handoff server 30 may continue to route only encapsulated media stream 65b to telecommunication device 100, or may route any appropriate mix of encapsulated media stream 65a and packets 75 to telecommunication device 100. Handoff server 30 also continues to transmit both media stream 65b and packets 75 to mobile station 20. Mobile station 20 may continue to play only media stream 65b or may play any appropriate mix of media stream 65b and packets 75 to the user.

Mobile station 20 and handoff server 30 may then synchronize media streams 65 and packets 75 received by each component. Handoff server 30 may perform media processing on media stream 65a and/or packets 75 received from telecommunication device 100, such as delay and level difference compensation and/or any other form of appropriate processing, to synchronize media stream 65a and packets 75 and ensure that the switchover between media stream 65a and packets 75 appears seamless to telecommunication device 100. This media processing may result in time-shifting, mixing, or other processing of media stream 65a and/or packets 75. Mobile station 20 may also perform any appropriate media processing to synchronize packets 75 and media stream 65b and ensure that the switchover appears seamless to a user of mobile station 20. This media processing may also result in time-shifting, mixing, or other processing of media stream 65a and/or packets 75.

Once handoff server 30 synchronizes packets 75 and media stream 65a and mobile station 20 synchronizes packets 75 and media stream 65b, handoff server 30 and mobile station 20 may determine that a switchover between circuit-switched link 80 and packet-based link 90 can proceed. Mobile station 20 and handoff server 30 may determine this based on signaling between the two components, based on a predetermined time limit allotted for synchronization, or based on any other appropriate consideration. At the appropriate time, handoff server 30 stops transmitting media stream 65b to mobile station 20 and transmits only packets 75. Additionally, mobile station 20 stops transmitting media stream 65a to handoff server 30 and transmits only packets 75.

After the switchover from circuit-switched link 80 to packet-based link 90 is complete, communication session 55 continues to facilitate communication between mobile station 20 and telecommunication device 100, now using packet-based link 90. Handoff server 30 and mobile station 20 may also tear down circuit-switched link 80. Mobile station 20, handoff server 30, and/or foreign agent 40 may also take any other steps appropriate to complete the handoff.

Thus, communication system 10a provides a handoff from packet-based link 90 to circuit-switched link 80 and from circuit-switched link 80 to packet-based link. Additionally, because handoff server 30 may provide synchronized RTP, UDP, and IP headers for the new communication session after switchover, the handoff may be transparent to telecommunication device 100 at the call control layer in a particular embodiment. As a result, communication system 10a simplifies operation of telecommunication device 100 and provides enhanced telecommunication service for the user. Furthermore, because the handoff procedure provided by communication system 10a does not rely upon telecommunication device 100 to perform any steps of the handoff procedure, the handoff procedure may be easier to implement in existing systems than alternative solutions.

Figure 2:
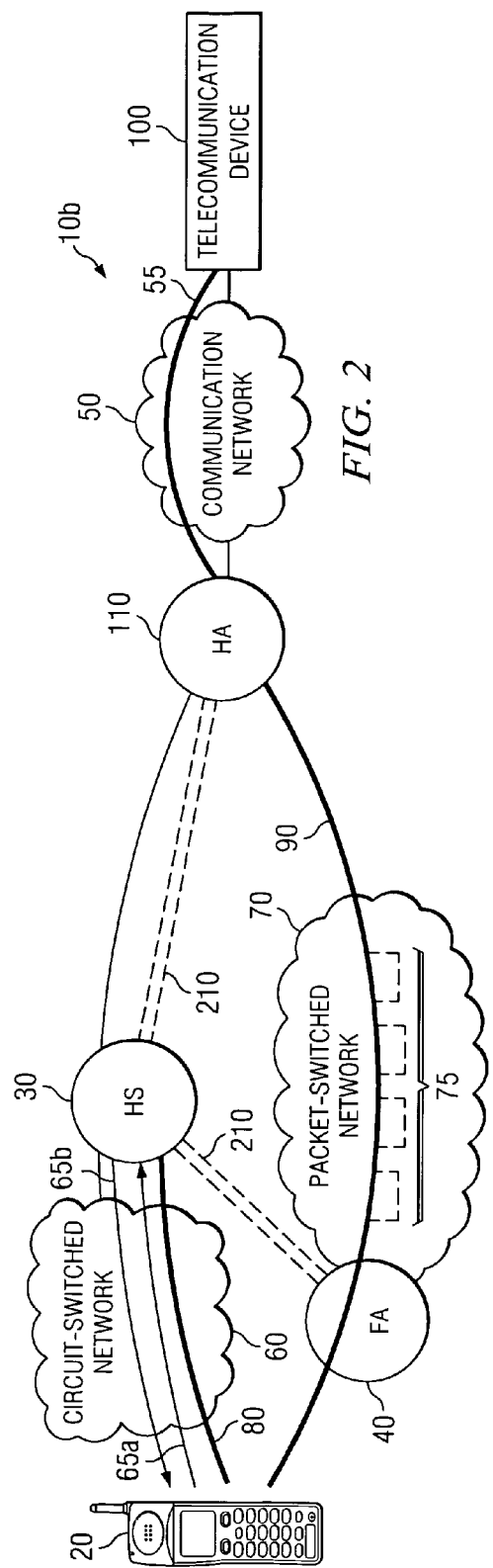
FIG. 2 illustrates operation of the communication system according to an alternative embodiment.

FIG. 2 illustrates an alternative embodiment of communication system 10a illustrated in FIG. 1. Specifically, FIG. 2 illustrates communication system 10b. Communication system 10b includes mobile station 20, handoff server 30, foreign agent 40, circuit-switched network 60, packet-based network 70, communication network 80, and telecommunication device 100. Communication system 10b also includes a home agent 110. In communication system 10b, handoff server 30 may not initially be configured to receive information transmitted by mobile station 20 over packet-based link 90. As a result, handoff server 30 may re-route packet-based link 90 or obtain routing information, such as RTP, UDP, and IP headers, from other components of communication system 10b to facilitate a handoff for mobile station 20.

Home agent 110 forwards media received for mobile station 20 from telecommunication device 100 for mobile station 20 to a care-of address provided by foreign agent 40. Home agent 110 also transmits packets 75 received from foreign agent 40 to telecommunication device 100. Home agent 110 may represent a conventional server, a networked PC, or any other component, including any appropriate combination of hardware and/or software, suitable to provide the described functionality. Home agent 110 may maintain a durable relationship with mobile station 20 or may be dynamically assigned to mobile station 20 as mobile station 20 changes locations.

In operation, mobile station 20 initiates a communication session 55 with telecommunication device 100 that utilizes packet-based link 90 with handoff server 30 over packet-based network 70 or circuit-switched link 80 with handoff server 30 over circuit-switched network 60. When mobile station 20 detects a handoff trigger, mobile station 20 and handoff server 30 execute a handoff between packet-based network 70 and circuit-switched network 60, or between circuit-switched network 60 and packet-based network 70.

For example, assume mobile station 20 initiates communication with telecommunication device 100 by establishing communication session 55 over a packet-based link 90 with home agent 110. In a particular embodiment, communication session 55 represents a Voice over IP (VoIP) call between mobile station 20 and telecommunication device 100. In such an embodiment, packet-based link 90 may represent a mobile-IP tunnel connecting mobile station 20 to home agent 110 through foreign agent 40 and other components of packet-switched network 70. Although the remainder of this description assumes that communication session 55 represents a VoIP phone call, communication session 55 may represent a video stream, realtime chat, multimedia conference, or any suitable communication session established using packet-based communication technologies.

Additionally, although communication network 50 may support communication in accordance with any appropriate communication protocol and telecommunication device 100 may represent any suitable communication device, for the purposes of simplicity the link or links of communication session 55 that connect handoff server 30 and telecommunication device 100 are assumed to represent a packet-based link. As a result, the discussion below describes communication between handoff server 30 and telecommunication device 100 in the form of packets 75. Nonetheless, communication network 50 may couple handoff server 30 and telecommunication device 100 using one or more packet-based or circuit-switched links, or links of any other appropriate type. Thus, communication between home agent 110 and telecommunication device 100 as part of communication session 55 may represent media transmitted in packets, frames, a continuous stream, and/or any other appropriate form.

In this embodiment, mobile station 20 establishes communication session 55 by placing a call to telecommunication device 100 through home agent 110 using conventional or other suitable VoIP techniques. After any signaling appropriate to set up the call, mobile station 20 and telecommunication device 100 establish communication session 55 that utilizes packet-based link 90. Additionally, during call set-up or at any other appropriate time, mobile station 20 communicates mobile identifier 25 to handoff server 30, and handoff server 30 communicates node identifier 35 to mobile station 20. As discussed above with respect to FIG. 1, mobile identifier 25 represents information by which handoff server 30 can uniquely identify mobile station 20 and node identifier 35 represents any information mobile station 20 sufficient for mobile station 20 to contact handoff server 30 on circuit-switched network 60, such as a phone number associated with handoff server 30.

Additionally, mobile station 20 communicates context information 125 to handoff server 30. Context information 125 identifies home agent 110 and/or foreign agent 40 associated with mobile station 20. For example, mobile station 20 may be configured to always use a particular home agent 110, and mobile station 20 may transmit context information 125 identifying that home agent 110 during call set-up for the cellular call. As another example, communication system 10*b* may dynamically assign home agents 110. Mobile station 20 may, as a result, wait to transmit context information 125 until after registering with an assigned foreign agent 40 and home agent 110. In this case, context information 125 may identify the dynamically-assigned home agent 110 and foreign agent 40. In the illustrated embodiment, mobile station 20 and handoff server 30 exchange mobile identifier 25, context information 125, and node identifier 35, in IP signaling messages transmitted through home agent 110 and foreign agent 40 according to conventional mobile IP techniques. In general, however, mobile station 20 and handoff server 30 may exchange this information in any suitable manner.

As part of the VoIP call, mobile station 20 transmits media in the form of packets 75 to home agent 110 over packet-based link 90. Home agent 110 then transmits packets 75 to telecommunication device 100 over communication network 50. Also, as part of the VoIP call, telecommunication device 100 sends VoIP packets 75 for mobile station 20 to home agent 110. Home agent 110 then routes VoIP packets 75 to mobile station 20 over packet-based link 90.

During communication, mobile station 20 may detect a handoff trigger. In response to the handoff trigger, mobile station 20 makes a handoff call to handoff server 30 through circuit-switched network 60 using node identifier 35, as described above. During the handoff call, mobile station 20 communicates mobile identifier 25 to handoff server 30 and, using mobile identifier 25, handoff server 30 associates the handoff call with context information 125. Based on context information 125, handoff server 30 identifies home agent 110 or foreign agent 40 that supports existing packet-based link 90. In a particular embodiment, context information 125 may identify home agent 110. Handoff server 30 may then contact home agent 110 to identify foreign agent 40, based on registration information stored by home agent 110 for mobile station 20.

Because, in communication system 10*b*, packet-based link 90 is not initially routed through handoff server 30, handoff server 30 operating alone may not be able to synchronize media communicated over packet-based link 90 with media communicated over circuit-switched link 80 in order to provide a seamless handoff. To overcome this problem, handoff server 30 may establish an alternative link 120 between handoff server 30 and foreign agent 40 in a particular embodiment. Alternative link 120 may represent a bi-directional edge tunnel (BET) or any other appropriate mechanism for redirecting packets 75 transmitted over packet-based link 90 so that packets 75 are routed through handoff server 30. After establishing alternative link 120, handoff server 30 may take any additional steps appropriate to redirect media from packet-based link 90 through handoff server 30. For example, handoff server 30 may additionally register with home agent 110 as a foreign agent for mobile station 20. In registering as a foreign agent for mobile station 20, handoff server 30 provides home agent 110 a new care-of address to replace the care-of address provided by foreign agent 40 during the initial registration of mobile station 20. In response to the registration, home agent 110 begins forwarding all packets 75 received for mobile station 20 to handoff server 30. Thus, as a result of the initiation of alternative link 120 and any additional steps taken by handoff server 30, packet-based link 90 is rerouted as packet-based link 90*b* that includes alternative link 120. As a result packet-based link 90*b* and circuit-switched link 80 are both routed through handoff server 30.

Handoff server 30 may then extract routing information from media communicated over packet-based link 90*b*. For example, as described above with respect to FIG. 1, handoff server 30 may extract RTP, UDP, and IP headers from packet-based link 90 and use these headers to encapsulate media stream 65*a* received from mobile station 20 over circuit-switched link 80. Handoff server 30 and mobile station 20 may then each synchronize media communicated over packet-based link 90 with media communicated over circuit-switched link 80 and complete the handoff as described above with respect to FIG. 1.

As an alternative or supplement to alternative link 120, home agent 110 may assist handoff server 30 in executing the handoff. For example, when handoff server 30 receives the handoff call from mobile station 20, handoff server 30 may identify home agent 110 based on mobile identifier 25 and context information 125. Handoff server 30 may then send a message to home agent 110 indicating that mobile station 20 has requested a handoff. Home agent 110 may then extract routing information from packets 75 communicated over packet-based link 90, such as RTP, UDP, and IP header information, and transmit the routing information to handoff server 30. After receiving the routing information, handoff server 30 may encapsulate media stream 65*a* using the routing information and transmit encapsulated media stream 65*a* to home agent 110.

Additionally, in communication system 10*b*, home agent 110 may assist handoff server 30 in synchronizing and processing media communicated over circuit-switched link 80 and packet-based link 90. For example, once handoff server 30 informs home agent 110 of the requested handoff, home agent 110 may begin performing media processing on packet-based link 90, such as delay and level difference estimation between packet-based link 90 and circuit-switched link 80. Home agent 110 may then transmit a delay-difference estimate to handoff server 30, and handoff server 30 may use the delay-difference estimate to perform delay-difference compensation on media stream 65*a* before handoff server 30 transmits media stream 65*a* to telecommunication device 100.

Alternatively, handoff server 30 may inform home agent 110 that mobile station 20 has requested a handoff and forward media stream 65*a* to home agent 110. Home agent 110 may then perform media processing on media stream 65*a*. For example, home agent 110 may perform both delay- and level-difference estimation and compensation on media stream 65*a*. In such a configuration, home agent 110 may also extract routing information from packet-based link 90 and use the routing information to encapsulate media stream 65*a* for transmission to telecommunication device 100. As discussed above, this routing information may represent RTP, UDP, and IP header information received over packet-based link 90 from which home agent 110 can generate RTP, UDP, and IP headers to encapsulate media stream 65*a* for delivery to telecommunication device 100. Home agent 110 may then perform switchover from packet-based link 90 to circuit-switched link 80 as described above for handoff server 30 with respect to FIG. 1. Similarly, mobile station 20 may perform switchover between packets 75 received from telecommunication device 100 and media stream 65*b* as described above.

Meanwhile, mobile station 20 also synchronizes packets 75 received over packet-based link 90 with media stream 65*b* received over circuit-switched link 80. Once handoff server 30 or home agent 110 has synchronized packets 75 and media stream 65a and mobile station 20 has synchronized packets 75 and media stream 65b, handoff server 30 and mobile station 20 may determine that switchover can proceed. As discussed above, mobile station 20 and handoff server 30 may determine this based on signaling between the two components, based on a predetermined time limit allotted for synchronization, or based on any other appropriate consideration. Additionally, at the appropriate time, mobile station 20 stops transmitting packets 75 to handoff server 30 and handoff server 30 stops transmitting packets 75 to mobile station 20.

As another example of the operation of communication system 10b, mobile station 30 may instead detect a handoff trigger while communicating with telecommunication device 100 over circuit-switched network 60. More specifically, while operating within a geographic area associated with circuit-switched network 60, mobile station 20 may establish communication session 55 with telecommunication device 100, as described above with respect to FIG. 1. In this case, communication session utilizes circuit-switched link 80, connecting mobile station 20 and handoff server 30. Communication system 10b may facilitate communication session 55, as described above in connection with FIG. 1, with handoff server 30 additionally transmitting media received from mobile station 20 to home agent 110 for subsequent transmission to telecommunication device 100. In this embodiment, handoff between circuit-switched link 80 and packet-based link 90 may proceed as described above in connection with FIG. 1, with mobile station 20 and handoff server 30 exchanging node identifier 35, mobile identifier 25, and context information 125 as described above.

During communication, mobile station 20 may enter a geographic area associated with packet-based network 70. Mobile station 20 may then register with home agent 110 for mobile IP service through packet-based network 70 using foreign agent 40, as described above. After registering with home agent 110, mobile station 20 may detect a handoff trigger, as described above. Upon detecting the handoff trigger, mobile station 20 places a handoff call to handoff server 30. The handoff call may represent a VoIP call sent to handoff server 30 through foreign agent 40 and home agent 110, or any other appropriate form of communication. In response to the handoff call, handoff server 30 may identify, based on context information 125, home agent 110 and/or foreign agent 40 associated with mobile station 20.

Handoff server 30 and/or home agent 110 then establish packet-based link 90 between mobile station 20 and home agent 110 in any appropriate manner. For example, handoff server 30 may contact foreign agent 40 to establish alternative link 120. Handoff server 30 may then register a care-of address for mobile station 20 with home agent 110, thereby establishing packet-based link 90 that includes alternative link 120. Alternatively, home agent 110 may establish packet-based link 90 with mobile station 20 and may interact with home agent 110 to synchronize media streams 65 and packets 75.

After establishing packet-based link 90, mobile station 20 and handoff server 30 and/or home agent 110 proceed, at the appropriate time, with the handoff between circuit-switched network 60 and packet-based network 70 as described for the circuit-switched to packet-based example above. This may include any appropriate synchronization of media streams 65 and packets 75 by mobile station 20, handoff server 30, and/or home agent 110. Once the handoff has been complete, handoff server 30 may terminate circuit-switched link 80.

By allowing mobile station 20 to initiate a handoff with handoff server 30 that does not represent home agent 110 of mobile station 20, communication system 10b may permit mobile station 20 to utilize local components for the handoff even when traveling outside the home network of mobile station 20. Moreover, communication system 10b may permit mobile station 20 to utilize a local handoff server 30 despite the fact that home agent 110 assigned to mobile station 20 does not support handoffs of this type. Thus, mobile communication 10b may provide significant flexibility and improved service to users operating outside the home network of mobile station 20.

Figure 3:
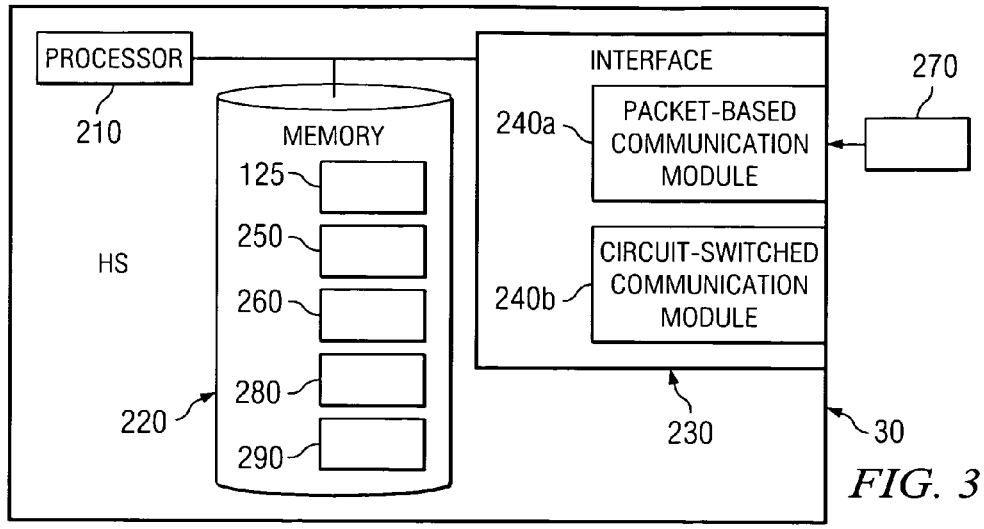
FIG. 3 is a block diagram illustrating contents of a handoff server according to a particular embodiment.

FIG. 3 is a block diagram illustrating the contents of handoff server 30 in a particular embodiment. Handoff server 30 includes a processor 220, a memory 230, and an interface 240. In general, handoff server 30, as previously discussed, supports communication between mobile station 20 and telecommunication device 100 and executes a handoff between packet-based network 70 and circuit-switched network 60 or between packet-based network 70 and circuit-switched network 60. More specifically, handoff server 30 may transfer communication between mobile station 20 from packet-based link 90 to circuit-switched link 80 or from circuit-switched link 80 to packet-based link 90, in response to a handoff call received from mobile station 20.

Processor 220 provides processing functionality for communication and other services offered by handoff server 30. Processor 220 may be a general purpose computer, dedicated microprocessor, or other processing device capable of generating and communicating electronic information. Examples of processor 220 include application-specific integrated circuits (ASICs), field-programmable gate arrays (FPGAs), digital signal processors (DSPs) and any other suitable specific or general purpose processors. In general, processor 210 may represent any suitable combination of hardware and/or controlling logic capable of managing and controlling the operation of mobile station 20.

Memory 220 may store code 280, buffer media received from components of communication system, maintain configuration information 290 for handoff server 30, or provide for the storage of any other appropriate information. Additionally, in particular embodiments, memory 220 may store node identifier 250 for communication to mobile station 20 and may store stored mobile identifier 260 received from mobile station 20. In particular embodiments, memory 220 may also store context information 125. Memory 220 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Interface 230 provides for communication between handoff server 30 and other components of communication system 10. Additionally, interface 230 may include one or more communication modules 240 capable of facilitating communication between handoff server 30 and other components using a particular communications protocol. For example, in a particular embodiment, interface 230 includes packet-based communication module 240a and circuit-switched communication module 240b. Interface 230, packet-based communication module 240a, and circuit-switched communication module 240b may include any suitable combination of software and/or hardware for providing the described functionality.

In operation, handoff server 30 receives media from and transmits media to mobile station 20, telecommunication device 100, and/or other components of communication system 10 using interface 230 as described above with respect to FIGS. 1 and 2. During operation, the elements of handoff server 30 also operate to execute, at appropriate times, handoffs between communication links established between handoff server 30 and mobile station 20. For example, processor 30 may execute code 280 based upon configuration information 290 to control the operation of interface 230 in establishing a first communication link, such as packet-based link 90, with mobile station 20. Furthermore, processor 30 may establish packet-based link 90 using a particular communication module 240, in this case, packet-based communication module 240a. Under these circumstances, packet-based link 90 represents at least a portion of a communication session between mobile station 20 and telecommunication device 100.

Processor 210 may then transmit a node identifier 250 to mobile station 20 and receive a stored mobile identifier 260 from mobile station 20 over packet-based link 90 through interface 230. Processor 210 may store stored mobile identifier 260 in memory 220, associating stored mobile identifier 260 with information identifying packet-based link 90. In particular embodiments, processor 210 may also receive context information 125 from mobile station 20 and may store context information 125 in memory 220. Handoff server 30 then begins receiving media from and transmitting media to mobile station 20 and telecommunication device 100 through interface 230.

At an appropriate time, processor 210 may detect a handoff call received by interface 230 that includes handoff mobile identifier 270. Processor 210 may then use handoff mobile identifier 270 to identify packet-based link 90 based on stored mobile identifier 260 stored in memory 220. Processor 210 may then establish a second communication link, such as circuit-switched link 80 with mobile station 20 through interface 230. Processor 210 may establish circuit-switched link 80 using a particular communication module 240, in this case, circuit-switched communication module 240b. Processor 210 may then execute the handoff between the communication links in an appropriate manner, for example, as described above in any of the various scenarios illustrated by FIGS. 1 and 2.

Figure 4:
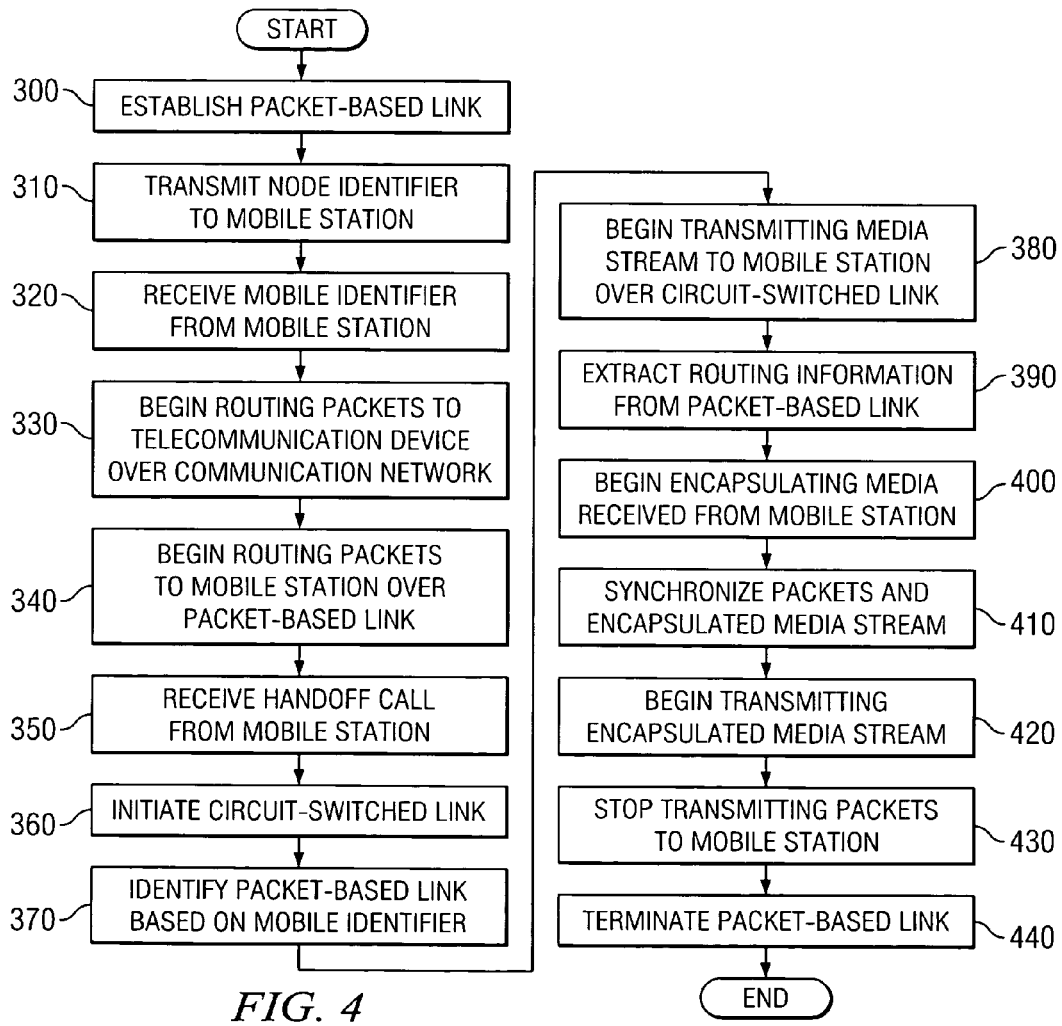
FIG. 4 is a flowchart illustrating operation of the handoff server in a particular embodiment.

FIG. 4 is a flow chart illustrating operation of handoff server 30 in communication system 10a as illustrated in FIG. 1. In the example illustrated by FIG. 4, mobile station 20 is assumed to initiate communication with telecommunication device 100 over packet-based network 70 and then switch to circuit-switched network 60 after detecting the handoff trigger. Furthermore, mobile station 20 is assumed to be registered with handoff server 30 as a mobile IP terminal at the outset of FIG. 4.

At step 300, handoff server 30 establishes packet-based link 90 with mobile station 20 through which mobile station 20 can transmit packets 75 to telecommunication device 100. At step 310, handoff server 30 transmits node identifier 35 to mobile station 20. Handoff server 30 receives mobile identifier 25 from mobile station 20 at step 320. At step 330, handoff server 30 begins transmitting packets 75 received from mobile station 20 over packet-based link 90 to telecommunication device 100. At step 340, handoff server 30 also begins transmitting media received from telecommunication device 100 to mobile station 20 over packet-based link 90 as packets 75.

Handoff server 30 then receives a handoff call from mobile station 20 that includes mobile identifier 25 at step 350. At step 360, handoff server 30 initiates circuit-switched link 80 with mobile station 20 in response to the handoff call. Handoff server 30 identifies packet-based link 90 associated with mobile station 20 based on mobile identifier 25 at step 370. At step 380, handoff server 30 begins transmitting media stream 65b to mobile station 20 over circuit-switched link 80.

At step 390, handoff server 30 begins extracting routing information from packet-based link 90. Handoff server 30 begins encapsulating media stream 65a received from mobile station 20 using routing information extracted from packet-based link 90, such as RTP, UDP, and IP headers, at step 400. At step 410, handoff server 30 synchronizes packets 75 received from mobile station 20 over packet-based link 90 and encapsulated media stream 65a. At step 420, handoff server 30 begins transmitting encapsulated media stream 65a. Handoff server 30 stops transmitting packets 75 to mobile station 20 at step 430. At step 440, handoff server 30 terminates packet-based link 90.

Figure 5:
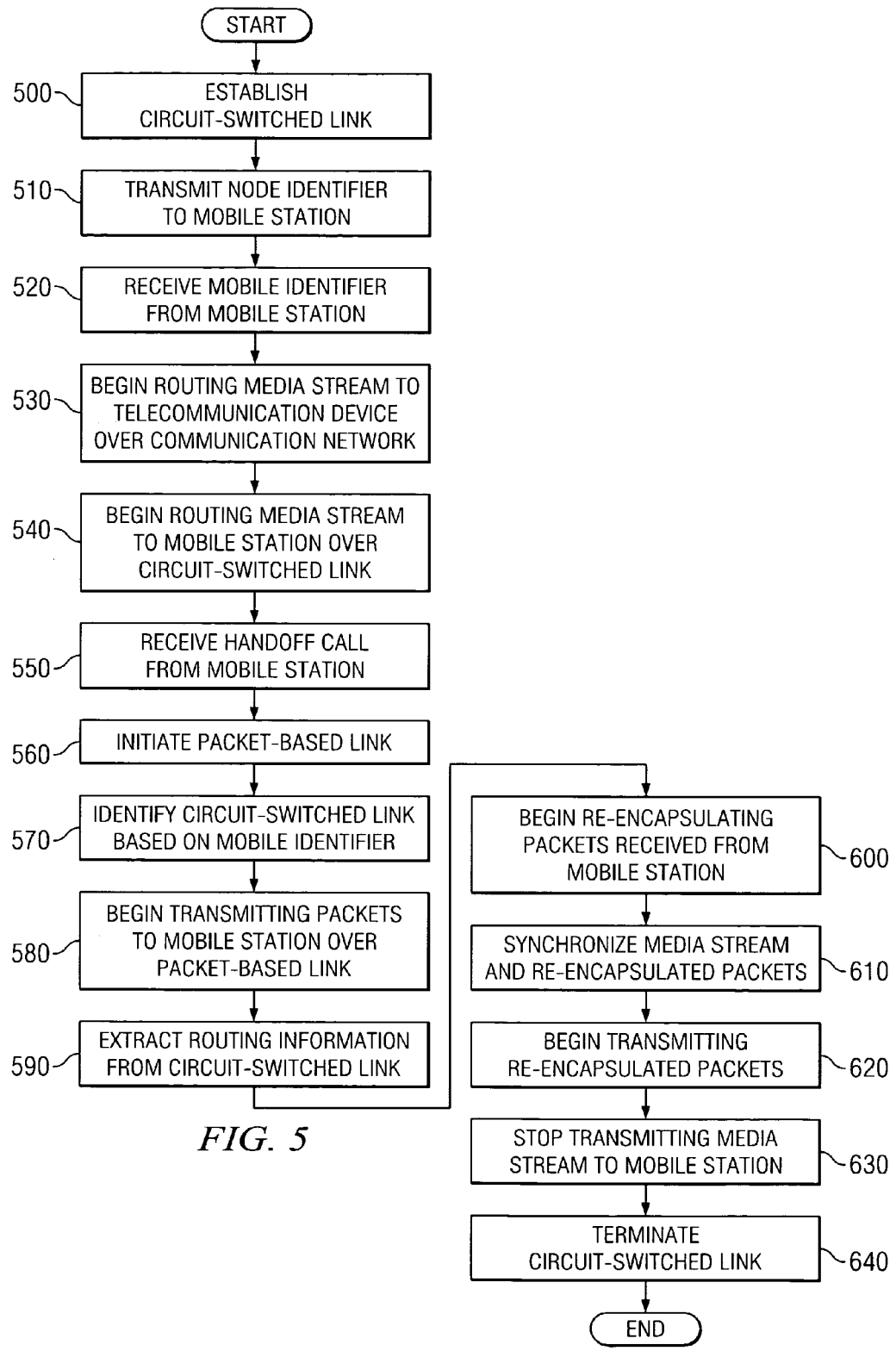
FIG. 5 is a flowchart illustrating operation of the handoff server in a particular embodiment.

FIG. 5 is a flow chart illustrating operation of handoff server 30 in communication system 10a as illustrated in FIG. 1. In the example illustrated by FIG. 5, mobile station 20 is assumed to initiate communication with telecommunication device 100 over circuit-switched network 60 and then switch to packet-based network 70 after detecting the handoff trigger.

At step 500, handoff server 30 establishes circuit-switched link 80 with mobile station 20 through which mobile station 20 can transmit media to telecommunication device 100. At step 510, handoff server 30 transmits node identifier 35 to mobile station 20. Handoff server 30 then receives mobile identifier 25 from mobile station 20 at step 520. At step 530, handoff server 30 begins transmitting media stream 65a received from mobile station 20 over circuit-switched link 80 to telecommunication device 100 as part of communication session 55. At step 540, handoff server 30 also begins transmitting media received from telecommunication device 100 to mobile station 20 over circuit-switched link 80 as media stream 65b.

Handoff server 30 then receives a handoff call from mobile station 20 that includes mobile identifier 25 at step 550. Handoff server 30 may also receive a registration request from foreign agent 40 that includes a care-of address for mobile station 20. At step 560, handoff server 30 initiates packet-based link 90 with mobile station 20 in response to the handoff call. Handoff server 30 identifies circuit-switched link 80 associated with mobile station 20 based on mobile identifier at step 570. At step 580, handoff server 30 begins transmitting packets 75 to mobile station 20 over packet-based link 90.

At step 590, handoff server 30 begins re-encapsulating packets 75 received from mobile station 20 using routing information associated with circuit-switched link 80 such as RTP, UDP, and IP headers. At step 600, handoff server 30 synchronizes media stream 65a received from mobile station 20 over circuit-switched link 80 and packets 75 received over packet-based link 90. At step 610, handoff server 30 begins transmitting re-encapsulated packets 75 to telecommunication device 100. Handoff server 30 stops transmitting media stream 65b to mobile station 20 at step 620. At step 630, handoff server 30 terminates circuit-switched link 80.

While the embodiments illustrated and the preceding description focus on a particular embodiment of handoff server 30 that includes specific elements, communication system 10 contemplates handoff server 30 having any suitable combination and arrangement of elements for facilitating communication and executing handoffs. Therefore, the components and functionalities described may be separate or combined as appropriate, and some or all of the functionalities of handoff server 30 may be performed by logic encoded in media, such as software and/or programmed logic devices.

Moreover, communication system 10 contemplates handoff server 30 incorporating any suitable number and type of elements, such as processors, memory devices, network interfaces, and other elements suitable for providing the functionalities described in addition to any other suitable operations in any appropriate manner. For example, although the above description describes embodiments of communication system 10 that include a packet-based network 70 and a circuit-switched network 60, the present invention contemplates use with heterogeneous networks providing communication according to any appropriate communication protocols, techniques, and/or technologies.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing telecommunication service, comprising:
   transmitting a node identifier to a mobile station over a first network, wherein the first network supports a first communication protocol;
   receiving, at a device comprising a handoff server identified by the node identifier, a handoff call from the mobile station over a second network that supports a second communication protocol, wherein the handoff call includes a mobile station identifier; and
   in response to receiving the handoff call:
      identifying, based on the mobile station identifier, a first communication link over the first network;
      establishing, by the device, an alternative link through the handoff server to redirect a plurality of packets from the first communication link to the alternative link, the packets redirected from communication between a foreign agent of the first network and a home agent to the alternative link;
      initiating, over the second network, a second communication link with the mobile station;
      extracting routing information from media redirected from the first communication link identified by the mobile station identifier received over the second network;
      encapsulating media received over the second communication link by replacing one or more header fields of the media with the routing information extracted from media redirected from the first communication link; and
      transmitting the media received over the second communication link to a remote element identified by the extracted routing information.

2. The method of claim 1, wherein transmitting media received over the second communication link comprises:
   encapsulating, based on the routing information, media received over the second communication link; and
   transmitting the encapsulated media to the remote element.

3. The method of claim 2, wherein extracting routing information comprises extracting one of User Datagram Protocol (UDP), Internet Protocol (IP) and Real-time Transfer Protocol (RTP) header information.

4. The method of claim 2, wherein encapsulating media comprises attaching a Real-time Transport Protocol (RTP) header, based on the routing information, to media received over the first communication link.

5. The method of claim 1, further comprising terminating the first communication link.

6. The method of claim 1, wherein identifying the first communication link comprises:
   identifying context information associated with the first communication link based on the mobile identifier;
   determining a foreign agent associated with the first communication link, based on the context information; and
   establishing an alternative link with the foreign agent.

7. The method of claim 6, wherein extracting the routing information comprises:
   receiving media associated with the first communication link from the alternative link; and
   extracting the routing information from the media received over the alternative link.

8. The method of claim 1, wherein extracting routing information comprises:
   identifying context information associated with the first communication link based on the mobile identifier;
   determining a home agent based on the context information; and
   notifying the home agent of the handoff call.

9. The method of claim 8, wherein extracting the routing information comprises receiving routing information from the home agent.

10. A system for providing telecommunication service, comprising:
    a handoff server operable to:
       transmit a node identifier identifying the handoff server to a mobile station over a first network operable to support communication according to a first communication protocol;
       receive a handoff call from the mobile station over a second network operable to support communication according to a second communication protocol, wherein the handoff call includes a mobile station identifier; and
       in response to receiving the handoff call:
          identify, based on the mobile station identifier, a first communication link over the first network;
          establish an alternative link through the handoff server to redirect a plurality of packets from the first communication link to the alternative link, the packets redirected from communication between a foreign agent of the first network and a home agent to the alternative link;
          initiate, over the second network, a second communication link with the mobile station;
          extract routing information from media redirected from the first communication link identified by the mobile station identifier received over the second network;
          encapsulate media received over the second communication link by replacing one or more header fields of the media with the routing information extracted from media redirected from the first communication link; and
          transmit the media received from the mobile station on the second communication link to a remote element identified by the extracted routing information.

11. The system of claim 10, wherein the handoff server is further operable to transmit the media by:
    encapsulating, based on the routing information, media received through the second communication link; and
    transmitting the encapsulated media to the remote element.

12. The system of claim 11, wherein the handoff server is further operable to extract routing information by extracting one of User Datagram Protocol (UDP), Internet Protocol (IP) and Real-time Transfer Protocol (RTP) header information.

13. The system of claim 11, wherein the handoff server is further operable to encapsulate media by attaching a Real-time Transport Protocol (RTP) header, based on the routing information, to media received over the first communication link.

14. The system of claim 10, wherein the handoff server is further operable to terminate the first communication link.

15. The system of claim 10, wherein the handoff server is further operable to identify the first communication link by:
   identifying context information associated with the mobile identifier;
   determining a foreign agent associated with the first communication link, based on the context information; and
   establishing an alternative link with the foreign agent.

16. The system of claim 15, wherein the handoff server is further operable to extract the routing information by:
   receiving media associated with the communication session over the alternative link; and
   extracting the routing information from the media received over the alternative link.

17. The system of claim 16, wherein the handoff server is further operable to identify the first communication process by:
   identifying context information associated with the mobile identifier;
   determining a home agent associated with the mobile station based on the context information; and
   notifying the home agent of the handoff call.

18. The system of claim 17, wherein the handoff server is further operable to extract the routing information from the first communication link by receiving the routing information from the home agent.

19. A non-transitory computer readable medium comprising logic for providing telecommunication service, the logic operable when executed to perform the steps of:
   transmitting a node identifier to a mobile station over a first network, wherein the first network supports a first communication protocol;
   receiving, at a device identified by the node identifier, a handoff call from the mobile station over a second network that supports a second communication protocol, wherein the handoff call includes a mobile station identifier; and
   in response to receiving the handoff call: identifying the first communication link based on the mobile station identifier;
   establishing an alternative link through a handoff server to redirect a plurality of packets from the first communication link to the alternative link, the packets redirected from communication between a foreign agent of the first network and a home agent to the alternative link;
   initiating, over the second network, a second communication link with the mobile station;
   extracting routing information from media redirected from the first communication link identified by the mobile station identifier received over the second network;
   encapsulating media received over the second communication link by replacing one or more header fields of the media with the routing information extracted from media redirected from the first communication link; and
   transmitting the media received over the second communication link to a remote element identified by the extracted routing information.

20. The computer readable medium of claim 19, wherein the logic is further operable to perform the step of transmitting media received over the second communication link by:
   encapsulating, based on the routing information, media received through the second communication link; and
   transmitting the encapsulated media to the remote element.

21. The computer readable medium of claim 20, wherein the logic is further operable to perform the step of extracting routing information by extracting one of User Datagram Protocol (UDP), Internet Protocol (IP) and Real-time Transfer Protocol (RTP) header information.

22. The computer readable medium of claim 20, wherein the logic is further operable to perform the step of encapsulating media by attaching a Real-time Transport Protocol (RTP) header, based on the routing information, to media received over the first communication link.

23. The computer readable medium of claim 19, wherein the logic is further operable to terminate the first communication link.

24. The computer readable medium of claim 19, wherein the logic is further operable to perform the step of identifying the first communication link by:
   identifying context information associated with the first communication link based on the mobile identifier;
   determining a foreign agent associated with the first communication link, based on the context information; and
   establishing an alternative link with the foreign agent.

25. The computer readable medium of claim 24, wherein the logic is further operable to perform the step of extracting the routing information by:
   receiving media associated with the first communication link from the alternative link; and
   extracting the routing information from the media received over the alternative link.

26. The computer readable medium of claim 19, wherein the logic is further operable to extract the routing information by:
   identifying context information associated with the first communication link based on the mobile identifier;
   determining a home agent based on the context information; and
   notifying the home agent of the handoff call.

27. The computer readable medium of claim 26, wherein the logic is further operable to extract the routing information by receiving routing information from the home agent.

28. An apparatus for providing telecommunication service, comprising:
   an interface operable to support communication on a first network according to a first communication protocol and to support communication on a second network according to a second communication protocol; and
   a processor operable to:
      transmit a node identifier identifying the apparatus to a mobile station over a first network, wherein the first network supports a first communication protocol;
      receive a handoff call from the mobile station over a second network that supports a second communication protocol, wherein the handoff call includes a mobile station identifier; and
      in response to receiving the handoff call:
         identify, based on the mobile station identifier, a first communication link over the first network;
         establish an alternative link through a handoff server to redirect a plurality of packets from the first communication link to the alternative link, the packets redirected from communication between a foreign agent of the first network and a home agent to the alternative link;

initiate a second communication link between the mobile station and the handoff server on the second network;

extract routing information from media redirected from the first communication link identified by the mobile station identifier received over the second network;

encapsulate media received over the second communication link by replacing one or more header fields of the media with the routing information extracted from media redirected from the first communication link; and transmit the media received from the mobile station on the second communication link to a remote element identified by the extracted routing information.

29. The apparatus of claim 28, wherein the processor is further operable to transmit the media by:

encapsulating, based on the routing information, media received through the second communication link; and transmitting the encapsulated media to the remote element.

30. The apparatus of claim 29, wherein the processor is further operable to extract routing information by extracting one of User Datagram Protocol (UDP), Internet Protocol (IP) and Real-time Transfer Protocol (RTP) header information.

31. The apparatus of claim 29, wherein the processor is further operable to encapsulate media by attaching a Real-time Transport Protocol (RTP) header, based on the routing information, to media received over the first communication link.

32. The apparatus of claim 28, wherein the processor is further operable to terminate the first communication link.

33. The apparatus of claim 28, wherein the processor is further operable to identify the first communication link by:

identifying context information associated with the mobile identifier;

determining a foreign agent associated with the mobile station based on the context information; and establishing an alternative link with the foreign agent.

34. The apparatus of claim 33, wherein the processor is further operable to extract the routing information by:

receiving media associated with the first communication link from the alternative link; and extracting the routing information from the media received over the alternative link.

35. The apparatus of claim 28, wherein the processor is further operable to identify the first communication process by:

identifying context information associated with the mobile identifier;

determining a home agent associated with the mobile station based on the context information; and notifying the home agent of the handoff call.

36. The apparatus of claim 35, wherein the processor is further operable to extract the routing information from the first communication link by receiving the routing information from the home agent.

37. A system for providing telecommunication service, comprising:

means for establishing a first communication link for a communication session between a mobile station and a remote element, the first communication link established over a first network that supports a first communication protocol;

means for transmitting a node identifier to a mobile station over the first communication link;

means for receiving a handoff call, at a device identified by the node identifier, from the mobile station over a second network that supports a second communication protocol, wherein the handoff call includes a mobile station identifier;

means for identifying the first communication link based on the mobile station identifier in response to receiving the handoff call;

means for establishing an alternative link through a handoff server to redirect a plurality of packets from the first communication link to the alternative link, the packets redirected from communication between a foreign agent of the first network and a home agent to the alternative link;

means for initiating, over the second network, a second communication link with the mobile station in response to receiving the handoff call;

means for extracting routing information from media redirected from the first communication link identified by the mobile station identifier received over the second network;

means for encapsulating media received over the second communication link by replacing one or more header fields of the media with the routing information extracted from media redirected from the first communication link; and means for transmitting the media received over the second communication link to the remote element identified by the extracted routing information.

* * * * *